United States Patent
Takizawa

(10) Patent No.: US 10,539,662 B2
(45) Date of Patent: Jan. 21, 2020

(54) RANGE FINDER AND OPTICAL DEVICE

(71) Applicant: NIKON VISION CO., LTD., Tokyo (JP)

(72) Inventor: Takao Takizawa, Yokohama (JP)

(73) Assignee: NIKON VISION CO., LTD., Tokyo (JP)

( * ) Notice: Subject to any disclaimer, the term of this patent is extended or adjusted under 35 U.S.C. 154(b) by 383 days.

(21) Appl. No.: 15/443,323

(22) Filed: Feb. 27, 2017

(65) Prior Publication Data

US 2017/0234972 A1 Aug. 17, 2017

Related U.S. Application Data

(63) Continuation of application No. PCT/JP2014/004413, filed on Aug. 27, 2014.

(51) Int. Cl.
G02B 27/64 (2006.01)
G01S 7/481 (2006.01)
G01S 17/10 (2006.01)

(52) U.S. Cl.
CPC ............ *G01S 7/4816* (2013.01); *G01S 17/10* (2013.01); *G02B 27/646* (2013.01)

(58) Field of Classification Search
CPC ......... G01C 3/06; G01S 7/497; G01S 7/4816; G01S 17/10; G02B 27/646; G02B 7/32; G02B 27/30; G02B 17/045; G03B 13/20; G03B 2217/005; G03B 2205/0007; H04N 5/23258; H04N 5/23287
USPC ...................................................... 356/5.01
See application file for complete search history.

(56) References Cited

U.S. PATENT DOCUMENTS

6,721,013 B1 * 4/2004 Tsujino .................. G02B 7/102
  348/345
7,502,064 B2 3/2009 Stavely et al.
7,688,353 B2 * 3/2010 Ishikawa ............ H04N 5/23209
  348/208.5

(Continued)

FOREIGN PATENT DOCUMENTS

JP H03-046642 A 2/1991
JP 2006-079074 A 3/2006

(Continued)

OTHER PUBLICATIONS

Dec. 2, 2014 International Search Report issued in Patent Application No. PCT/JP2014/004413.

(Continued)

*Primary Examiner* — Daniel L Murphy
(74) *Attorney, Agent, or Firm* — Oliff PLC

(57) ABSTRACT

A distance detection device is provided, including a calculating unit that calculates a distance to a detection target using a length of time until floodlighted light is received by a light-receiving unit; a first detecting unit that detects whether detection target changing operation is being performed; a second detecting unit that detects variation in the distance calculated by the calculating unit; a shake correcting optical system that is driven based on a shake detection result and through which the floodlighted light passes; and a control unit that controls driving of the shake correcting optical system using an output from the first detecting unit and an output from the second detecting unit.

8 Claims, 12 Drawing Sheets

(56) References Cited

U.S. PATENT DOCUMENTS

2006/0034598 A1  2/2006  Stavely et al.
2009/0309985 A1  12/2009  Ibi

FOREIGN PATENT DOCUMENTS

JP    2009-300614 A    12/2009
JP    2011-023988 A    2/2011

OTHER PUBLICATIONS

Feb. 28, 2017 International Preliminary Report on Patentability issued in Patent Application No. PCT/JP2014/004413.
Dec. 4, 2018 Japanese Office Action issued in Patent Application No. 2018-003007.

* cited by examiner

FIG. 10

| SIGHT. CHANGE FLAG | MOV. BODY FLAG | CUT-OFF FREQUENCY fc | BIAS COEFF. | CORRECTION RANGE | SIGHT. CHANGE START THRESHOLD VALUE Panωth_s | SIGHT. CHANGE END THRESHOLD VALUE Panωth_e |
|---|---|---|---|---|---|---|
| 0 | 0 | 0.1 Hz | NORMAL | NORMAL | NORMAL | NORMAL |
| 0 | 1 | 0.1 Hz | NORMAL | NORMAL | LOWER | NORMAL |
| 0 | 2 | LOWER THAN 0.1 Hz | REDUCE | WIDEN | LOWER | NORMAL |
| 1 | 0 | 1.0 Hz | NORMAL | NORMAL | NORMAL | NORMAL |
| 1 | 1 | 1.0 Hz | NORMAL | NORMAL | NORMAL | NORMAL |
| 1 | 2 | HIGHER THAN 1.0 Hz | INCREASE | NARROW | NORMAL | NORMAL |

RANGE FINDER AND OPTICAL DEVICE

BACKGROUND

1. Technical Field

The present invention relates to a distance detection device and an optical instrument.

2. Related Art

An image shake preventing device that controls operation of a shake correcting means based on an angular speed signal from a gyro sensor and a distance to a subject has been known (please see Patent Document 1).

[Patent Document 1] Japanese Patent Application Publication No. 2011-23988

There is an image shake preventing device that drives a correcting lens according to an output from a gyro sensor and a distance to a subject. However, it has been inconvenient in that a correcting lens is driven even if a shake is panning intended by a user.

SUMMARY

Therefore, it is an object of an aspect of the innovations herein to provide a distance detection device and an optical instrument, which are capable of overcoming the above drawbacks accompanying the related art. The above and other objects can be achieved by combinations described in the claims. A first aspect of the innovations may include a distance detection device including: a calculating unit that calculates a distance to a detection target using a length of time until floodlighted light is received by a light-receiving unit; a first detecting unit that detects whether detection target changing operation is being performed; a second detecting unit that detects variation in the distance calculated by the calculating unit; a shake correcting optical system that is driven based on a shake detection result and through which the floodlighted light passes; and a control unit that controls driving of the shake correcting optical system using an output from the first detecting unit and an output from the second detecting unit.

A second aspect of the innovations may include an optical instrument having the above-mentioned distance detection device.

The summary clause does not necessarily describe all necessary features of the embodiments of the present invention. The present invention may also be a sub-combination of the features described above.

BRIEF DESCRIPTION OF THE DRAWINGS

FIG. 10 is a table in which combinations of parameters determined based on sighting change judgment flags and moving body flags in the present embodiment are summarized.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
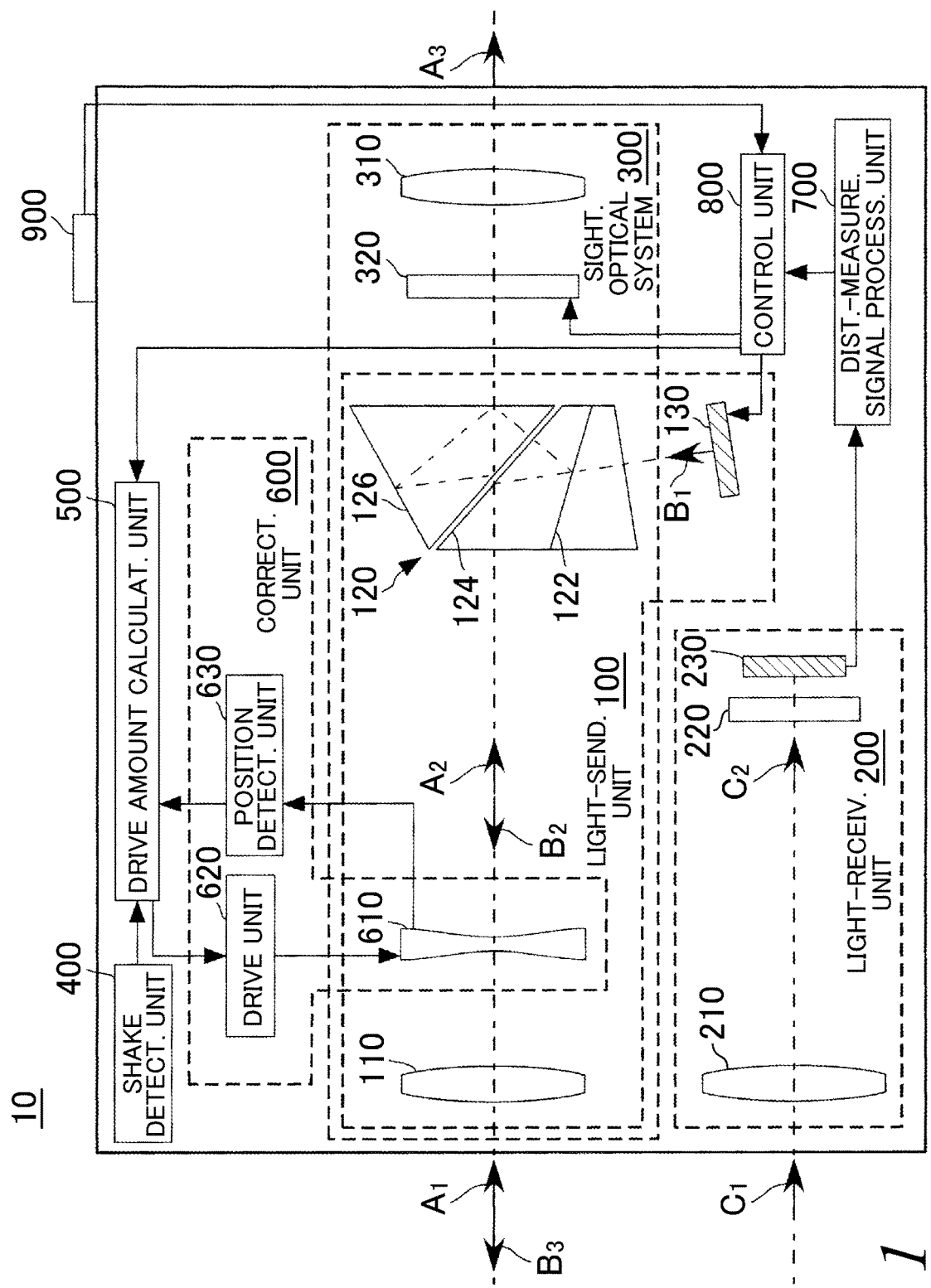
FIG. 1 is a block diagram of a range finder 10 according to the present invention.

FIG. 1 is a block diagram of a range finder 10 according to the present embodiment. The range finder 10 includes a light-sending unit 100, a light-receiving unit 200, a sighting optical system 300, a shake detecting unit 400, a drive amount calculating unit 500, a correcting unit 600, a distance-measurement signal processing unit 700, a control unit 800 and a manipulation button 900.

The light-sending unit 100 emits measurement light in a forward direction. The light-sending unit 100 has an objective lens 110, a correcting lens 610, an erecting prism 120 and a light-emitting unit 130. In the following explanation, in some cases, the direction in which the light-sending unit 100 in the range finder 10 emits measurement light, that is, the direction of an arrow indicative of a beam $B_3$ in the figure, is referred to as the forward direction.

The light-emitting unit 130 emits pulsed measurement light consisting of a predetermined number of pulses per unit time. In this case, the light-emitting unit 130 emits, as measurement light, pulsed light consisting of several hundreds to several thousands of pulses per second, for example. One example of the light-emitting unit 130 is a semiconductor laser that produces oscillating infrared region light. In the following explanation, an example is explained in which the light-emitting unit 130 emits infrared measurement light.

The erecting prism 120 has: a dichroic reflection surface 122 that reflects visible light band light and allows passage of infrared band light; and total reflection surfaces 124, 126 that have high reflectance not only for visible light band light, but for infrared band light. Measurement light passes through the dichroic reflection surface 122, is reflected on the total reflection surface 124, and propagates as a beam $B_2$ in the forward direction in the range finder 10. Furthermore, the erecting prism 120 uses the dichroic reflection surface 122, the total reflection surfaces 124, 126 and other reflection surfaces to invert a resupinated mirror image formed by incident beam to form an erecting normal image. Examples of the erecting prism 120 include a Dach prism, a Porro prism, and the like.

The objective lens 110 is disposed at a front end of the range finder 10, and its front end surface faces an object to be a distance-measurement target. In the following explanation, in some cases, an object to be a distance-measurement target is referred to as an object or a sighting target. A rear end surface of the objective lens 110 faces a front end surface of the erecting prism 120 with the correcting lens 610 being sandwiched therebetween.

The light-receiving unit 200 receives incident light that comes in from the forward direction, converts a signal indicative of the intensity of the incident light into an electrical signal, and outputs the electrical signal. The light-receiving unit 200 includes a light-receiving lens 210, a band transmission filter 220 and a light-receiving element 230 that form an optical system separate from the light-sending unit 100 and the sighting optical system 300. Thereby, the light-receiving unit 200 has an optical axis different from those of the light-sending unit 100 and the sighting optical system 300.

The band transmission filter 220 and the light-receiving element 230 are sequentially disposed behind the light-receiving lens 210. The band transmission filter 220 allows passage of narrow wavelength band light including measurement light, and blocks or attenuates light in other wavelength bands. Examples of the light-receiving element 230 include a photodiode, a phototransistor and the like that are sensitive to the wavelength band of measurement light. In terms of eliminating the influence of background light on measurement light, the light-receiving area of the light-receiving element 230 is preferably smaller.

In the above-mentioned light-receiving unit 200, a beam $C_1$ reflected on or scattered by an object located in the forward direction from the range finder 10 enters the light-receiving lens 210. The beam $C_1$ is concentrated by the light-receiving lens 210 to be a beam $C_2$ which propagates in the backward direction. After passing through the band transmission filter 220, the beam $C_2$ is received by the light-receiving element 230.

The light-receiving element 230 converts a received optical signal into an electrical signal corresponding to its intensity. An amplifier inside the light-receiving element 230 performs an amplification process on the electrical signal, and then the light-receiving element 230 outputs the electrical signal to the distance-measurement signal processing unit 700.

Based on the timing at which measurement light was emitted and the timing at which the light-receiving unit 200 received incident light, the distance-measurement signal processing unit 700 calculates the distance to an object on which sighting has been performed. The distance-measurement signal processing unit 700 includes a binarization circuit, a sampling circuitry, a counter circuit, an oscillator and the like. An electrical signal from the light-receiving element 230 is converted into a binarized signal according to a predetermined threshold value at the binarization circuit, and the binarized signal is output to the sampling circuitry. A sampling clock at a certain frequency is input to the sampling circuitry from the oscillator. Also, a count value is input to the sampling circuitry from the counter circuit. The sampling circuitry performs digital-sampling on the input binarized signal, and generates a received-light signal synchronized with the sampling clock. The count value is reset by the control unit 800 at the timing at which pulsed light is emitted from the light-emitting unit 130.

Based on count values about pulses of received-light signals, the distance-measurement signal processing unit 700 calculates a temporal difference between a time at which the light-emitting unit 130 emitted pulsed light and a time at which the light-receiving element 230 received incident light that was formed by reflection or the like on an object.

The distance-measurement signal processing unit 700 sequentially executes processes to calculate temporal differences in similar manners for respective pulsed light forming measurement light. Then, every time a temporal difference in pulses in received-light signals is calculated, the distance-measurement signal processing unit 700 integrates a signal value in a memory address corresponding to the temporal difference on an internal memory thereof. Thereby, a histogram for calculating distances is generated. Upon completion of the process on received-light signals corresponding to a predetermined number of pulsed light, the distance-measurement signal processing unit 700 identifies a memory address having the highest integrated value. The distance-measurement signal processing unit 700 recognizes a temporal difference $\Delta t$ corresponding to the memory address as a temporal difference between transmitted and received light corresponding to an object.

The distance-measurement signal processing unit 700 calculates a distance to an object based on the recognized temporal difference $\Delta t$. Specifically, the distance-measurement signal processing unit 700 converts the temporal difference into a distance according to the following equation.

$$l = c \times \Delta t / 2$$

where l is a distance to an object, and c is the velocity of light. The distance-measurement signal processing unit 700 sends, to the control unit 800, information about the calculated distance l to an object.

Also, in the present embodiment, the distance-measurement signal processing unit 700 repeats distance-measurement for sighting targets, and sequentially outputs distance-measurement signals. Here, a distance-measurement signal is a signal indicative of a temporal change in distances of an object that is calculated successively based on a temporal difference between a time at which the light-emitting unit 130 emitted pulsed light and a time at which the light-receiving element 230 received incident light formed by reflection or the like on an object. The distance-measurement signal processing unit 700 outputs the distance-measurement signal to the drive amount calculating unit 500 via the control unit 800.

The control unit 800 performs overall control of distance-measurement operation in the range finder 10. Control subjects of the control unit 800 include the light-sending unit 100, the light-receiving unit 200, the distance-measurement signal processing unit 700 and the like. On a reticle plate 320 and by means of a character, an image or the like, the control unit 800 shows a user information indicative of a distance to an object calculated by the distance-measurement signal processing unit 700 and the like.

The sighting optical system 300 performs sighting on an object and forms an optical image of a sighting target. The sighting optical system 300 has the reticle plate 320 and an ocular lens 310. The sighting optical system 300 further shares, with the light-sending unit 100, the objective lens 110, the correcting lens 610 and the erecting prism 120. Thereby, the light-sending unit 100 and the sighting optical system 300 have apparently matching optical axes. A user observes the forward direction through the sighting optical system 300, and performs sighting on an object.

The reticle plate 320 is arranged at the focus position of the objective lens 110 of the light-sending unit 100. A front end of the ocular lens 310 faces a rear end of the reticle plate 320 inside the range finder 10. The reticle plate 320 has a sighting index and a display unit. Examples of the shape of the sighting index include cross hairs, a rectangular frame, a circular frame and the like. A transmission-type liquid crystal or the like is used for the display unit to show a user a measurement result of a distance to an object by means of a character, an image or the like.

Among light reflected on or scattered by an object located in the forward direction from the range finder 10, a beam $A_1$ that propagates within a range of the visual angle of the objective lens 110 enters the sighting optical system 300. The beam $A_1$ is concentrated by the objective lens 110 to become a beam $A_2$ which is to be emitted as a beam $A_3$ in the backward direction from the range finder 10 after passing through the erecting prism 120, the reticle plate 320 and the ocular lens 310. Thereby, a user observes an erecting normal image of an object through the ocular lens 310.

A sighting index disposed in the reticle plate 320 is superimposed on an image observed by a user through the ocular lens 310. A user performs sighting by orienting the range finder 10 such that the sighting index is superimposed on an image of an object observed through the ocular lens 310. In this case, because the optical axes of the light-sending unit 100 and the sighting optical system 300 apparently match as explained above, a position indicated by the sighting index is irradiated with measurement light.

The shake detecting unit 400 includes a plurality of angular speed sensors the detection directions of which intersect with each other, and the like. The plurality of angular speed sensors are disposed oriented in directions that allow them to detect pitching and yawing of the range finder 10, for example. If the range finder 10 is shaken, each of the angular speed sensors detects the shake, and outputs, to the drive amount calculating unit 500, a shake signal corresponding to the shake amount including the direction, magnitude and frequency as information.

The drive amount calculating unit 500 refers to the shake signals output from the shake detecting unit 400 periodically to calculate the drive amount which is a displacement amount of the correcting lens 610. The drive amount is an amount by which the correcting lens 610 is displaced in order to cancel out an image shake of an optical image generated at the sighting optical system 300 due to displacement of the range finder 10. The drive amount includes information about directions and magnitudes. The drive amount calculating unit 500 outputs, to a drive unit 620, a drive signal for driving the correcting lens 610 by the drive amount.

In the present embodiment, the drive amount calculating unit 500 calculates a drive amount by which the correcting lens 610 should be driven by the correcting unit 600 based on a combination of an output from the distance-measurement signal processing unit 700 and a shake detection signal from the shake detecting unit 400, and outputs the drive amount to the correcting unit 600. In particular, in the present embodiment, a temporal change in distances calculated by the distance-measurement signal processing unit 700 is used as one example of an output from the distance-measurement signal processing unit 700.

The drive unit 620 displaces the correcting lens 610 in a direction intersecting its optical axis based on a drive signal received from the drive amount calculating unit 500. A voice coil motor, a piezoelectric motor or the like can be used for the drive unit 620, for example.

A position detecting unit 630 detects a position of the correcting lens 610 periodically, and outputs, to the drive amount calculating unit 500 and the control unit 800, a position signal which is a signal corresponding to the position. Other than a magnetometric sensor that uses a Hall element, an MR element or the like, for example, an optical position detecting sensor or the like can be used for the position detecting unit 630.

The drive amount calculating unit 500 feedback-controls a drive amount of the correcting lens 610 according to a position signal for the correcting lens 610 acquired from the position detecting unit 630. Thereby, even if external disturbances such as shocks or vibration are applied, the position of the correcting lens 610 can be controlled precisely.

The correcting unit 600 drives the correcting lens 610 using a drive amount corresponding to a shake of the optical axis of the sighting optical system 300. The correcting unit 600 includes the correcting lens 610, the drive unit 620 and the position detecting unit 630.

The correcting unit 600 may be performing correcting operation always, but it may execute correcting operation only during a period when a user is using the range finder 10. For example, it may be determined whether or not a user is using the range finder 10 by detecting an eye of a user looking into the ocular lens 310. Then, if it is determined that a user is using the range finder 10, the correcting unit 600 may be turned on or off. Also, the correcting unit 600 may start its operation based on a user manipulating the manipulation button 900. Thereafter, if manipulation by a user is absent for a predetermined length of time, operation of the correcting unit 600 may be stopped.

The correcting lens 610 is driven by the drive unit 620 near the objective lens 110 to displace each optical path of the beams $A_2$, $B_2$. Thereby, by the correcting lens 610 being displaced so as to optically cancel out displacement of the range finder 10 if it is displaced, a shake of an image observed by a user can be stopped. Because the correcting lens 610 is shared also by the light-sending unit 100, a single object can be kept irradiated with measurement light even if the range finder 10 is displaced.

Figure 2:
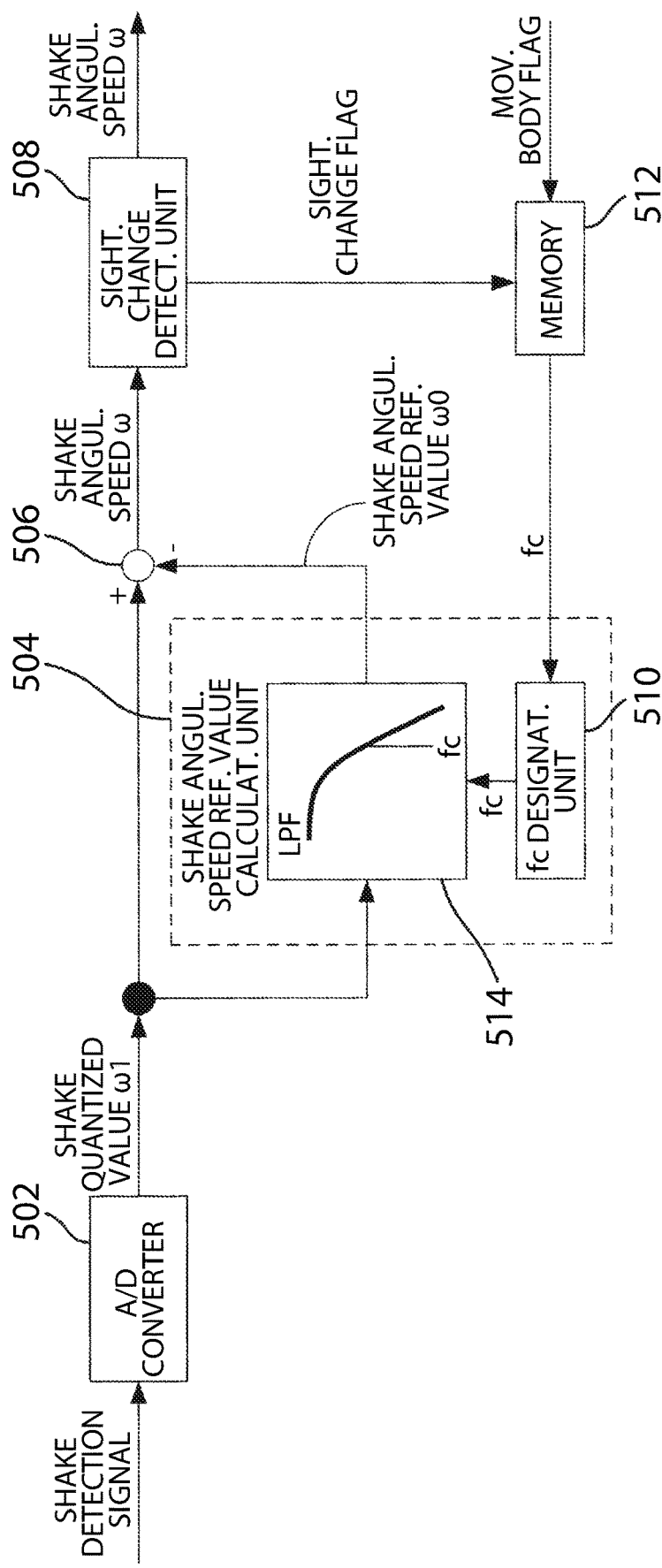
FIG. 2 is a block diagram of a portion, inside a drive amount calculating unit 500, that is related to calculation of a shake angular speed ω.

FIG. 2 is a block diagram of a portion, inside the drive amount calculating unit 500, that is related to calculation of a shake angular speed $\omega$. FIG. 2 shows processes performed inside the drive amount calculating unit 500. As shown in FIG. 2, the drive amount calculating unit 500 includes an A/D converter 502, a shake angular speed reference value calculating unit 504, a subtracting unit 506, a sighting change detecting unit 508, an fc designating unit 510, a memory 512 and an LPF processing unit 514.

The shake detecting unit 400 detects an angular speed caused by a shake generated in the range finder 10, and outputs, to the drive amount calculating unit 500, a shake detection signal which is a signal corresponding to the detection result. Based on the shake detection signal, the drive amount calculating unit 500 calculates a shake angular speed $\omega$ in order to determine a drive amount for the correcting lens 610. Specifically, the drive amount calculating unit 500 converts the shake detection signal into a shake quantized value $\omega 1$ obtained by a quantization process by the A/D converter 502 inside the drive amount calculating unit 500. Next, the shake angular speed reference value calculating unit 504 LPF-calculates, from the shake quantized value $\omega 1$, a shake angular speed reference value $\omega 0$ which serves as a reference for the shake quantized value $\omega 1$ using a cut-off frequency fc. The subtracting unit 506 subtracts the shake angular speed reference value $\omega 0$ from the shake quantized value $\omega 1$ to calculate a shake angular speed $\omega$. The process of calculating the shake angular speed $\omega$ from the shake quantized value $\omega 1$ eliminates low frequency components in the shake quantized value $\omega 1$, and substantially is an HPF process.

The sighting change detecting unit 508 detects a sighting change based on the magnitude of a shake signal from the shake detecting unit. The sighting change detecting unit 508 judges, based on the absolute value of the shake angular speed ω, whether or not a sighting change is underway, and memorizes, in the memory 512, a sighting change flag corresponding to the judgement result. In the judgement, a start threshold value Panωth_s of a sighting change and an end threshold value Panωth_e of a sighting change which are threshold values of a predetermined angular speed are used. The sighting change detecting unit 508 determines that a sighting change has started if the shake angular speed ω exceeds Panωth_s. Thereafter, it determines that the sighting change has ended if the shake angular speed ω becomes lower than Panωth_e.

The sighting change flag is set to 1 if it is judged that a sighting change is underway, for example. On the other hand, it is set to 0 if it is judged that a sighting change is not underway. A default value is defined for the sighting change flag, and at the time of activation of the range finder 10, it is set to 0, for example.

Also, a moving body flag described below is memorized in the memory 512. The moving body flag is set according to a temporal change in distances to an object obtained in distance-measurement. In the following explanation, in some cases, the sighting change flag and the moving body flag are collectively called flag information. Furthermore, other than the flag information to be updated successively, parameter information including predetermined cut-off frequencies fc, a bias coefficients Kbias described below, correction ranges and the like is memorized in the memory 512 based on combinations of the sighting change flag and the moving body flag. In addition, default values of the parameters and various types of threshold value information described below are memorized together in the memory 512.

The drive amount calculating unit 500 refers to the flag information in the memory 512, and outputs, to the fc designating unit 510, information about a predetermined cut-off frequency fc. The fc designating unit 510 specifies the cut-off frequency fc in the process by the LPF processing unit 514. The LPF processing unit 514 uses the cut-off frequency fc to calculate the shake angular speed reference value ω0 from the shake quantized value ω1. A default value is set for the cut-off frequency fc, and the default value is 0.1 Hz, for example.

Figure 3:
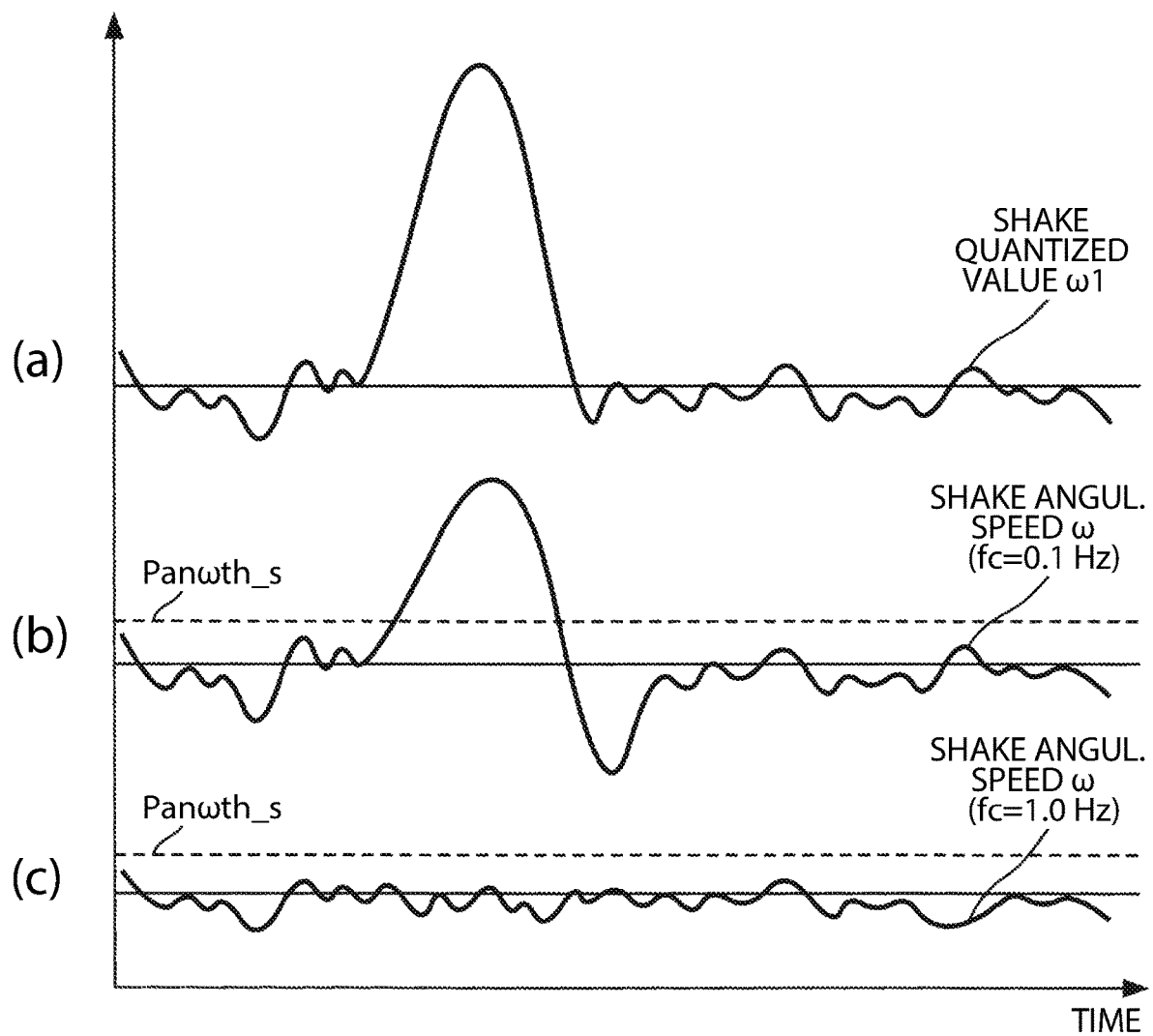
FIG. 3 is a figure for explaining an effect of a cut-off frequency fc.

FIG. 3 is a figure for explaining an effect of a cut-off frequency fc. (a) in FIG. 3 shows a shake quantized value ω1 acquired in a time-series manner. It shows that a sighting change is performed from a state where sighting is relatively stable. (b) in FIG. 3 shows a shake angular speed ω obtained by performing an HPF process on the shake quantized value ω1 at a cut-off frequency fc=0.1 Hz. Also, (c) in FIG. 3 shows a shake angular speed ω obtained by performing an HPF process on the shake quantized value ω1 at a cut-off frequency fc=1.0 Hz.

The range finder 10 calculates a target position of the correcting lens 610 for the shake angular speed ω. Because in (b) of FIG. 3, an HPF process is performed at a relatively low frequency of 0.1 Hz, relatively large angular speed components due to panning are remaining in shakes to be correction targets. In contrast to this, because in (c) of FIG. 3, an HPF process is performed at a relatively high frequency of 1.0 Hz, the large angular speed components are eliminated, and shakes to be correction targets are generally only components due to shakes.

In some cases, correcting all the shakes occurring to the range finder 10 causes inconvenience in use. For example, if panning is intended by a user, operation to correct shakes due to the panning impairs object trackability. As a result of this, there is a risk of not being able to capture an object in sighting. In view of this, in the present embodiment, if it is judged that a sighting change is underway, a cut-off frequency fc is set higher than a default value to exclude a high shake angular speed from shake correction targets as shown in (c) of FIG. 3.

Furthermore, in the present embodiment, the drive amount calculating unit 500 changes the value of a cut-off frequency fc successively according to temporal changes in distance-measurement results. Details are described below.

Figure 4:
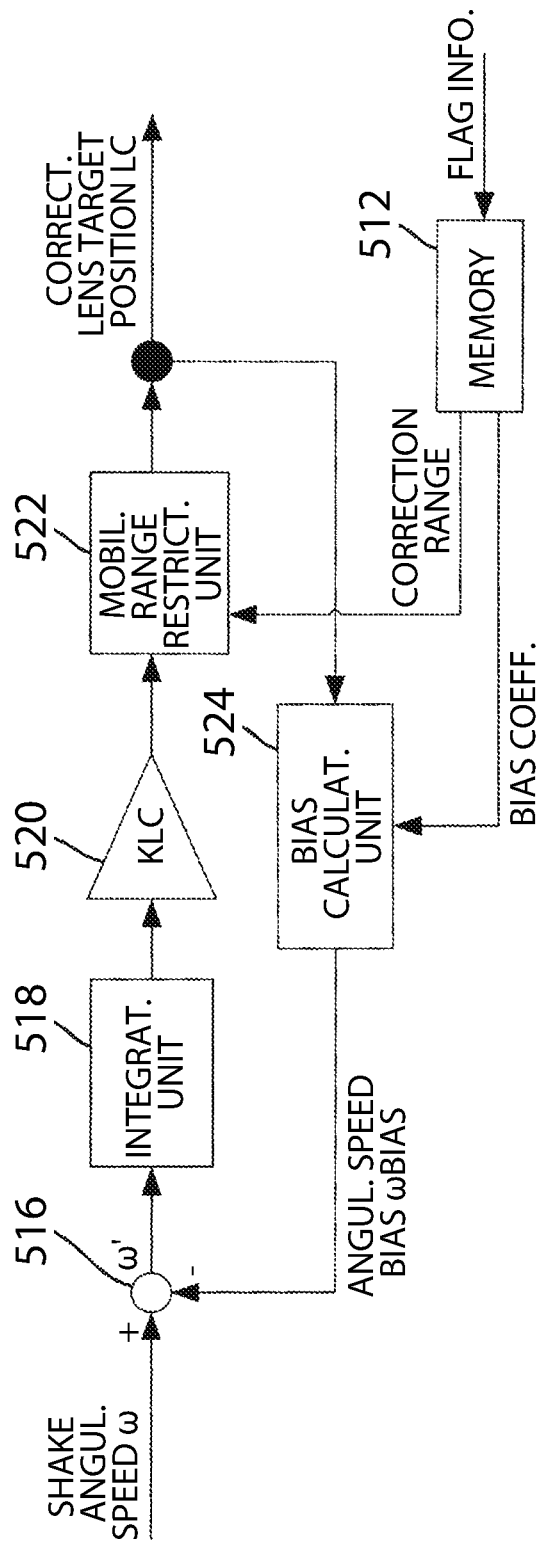
FIG. 4 is a block diagram of a portion, inside the drive amount calculating unit 500, that is related to calculation of a correcting lens target position LC.

FIG. 4 is a block diagram of a portion, inside the drive amount calculating unit 500, that is related to calculation of a correcting lens target position LC. As shown in FIG. 4, the drive amount calculating unit 500 includes the memory 512, a subtracting unit 516, an integrating unit 518, a multiplying unit 520, a mobility range restricting unit 522 and a bias calculating unit 524.

The drive amount calculating unit 500 calculates a correcting lens target value LC from a shake angular speed ω. Specifically, first, the drive amount calculating unit 500 time-integrates shake angular speeds ω at the integrating unit 518 to calculate an angle. Next, it multiplies the angle with a coefficient KLC at the multiplying unit 520 to calculate the correcting lens target position LC. The coefficient KLC is a conversion coefficient determined based on the focal length of the correcting lens 610 and the like.

In order for the shake correction to be performed appropriately, the correcting lens target position LC must be within the mobility range of the correcting lens 610. If a user alters sighting, in some cases, a large shake angular speed occurs to the range finder 10. As a result of performing shake correction on the large shake angular speed at this time, the correcting lens 610 may reach the limit of its physical mobility range. If the correcting lens 610 reaches the limit of the physical mobility range, further shake correcting operation is restricted.

In view of this, by converting the correcting lens target position LC so as not to exceed a predetermined mobility restriction range which is narrower than the physical mobility range, the mobility range restricting unit 522 prevents contact of the correcting lens 610 with the physical mobility range. In the present embodiment, the drive amount calculating unit 500 switches a correction range which is the mobility restriction range as appropriate according to flag information memorized in the memory 512.

Also, in the present embodiment, the drive amount calculating unit 500 changes the value of the angular speed bias ωbias that acts to bring the correcting lens target position LC close to the center of the mobility range to constrain the drive amount of the correcting lens 610. Here, the angular speed bias ωbias is a function of the distance from the center of the mobility range of the correcting lens 610 to the calculated correcting lens target position LC. Details are described below.

Specifically, a process of subtracting the angular speed bias amount ωbias from the shake angular speed ω is performed. The process is performed at the bias calculating unit 524 and the subtracting unit 516. Then, recalculation of the correcting lens target position LC is performed using an angular speed ω' which is a difference obtained by the process. The drive amount calculating unit 500 performs calculation of a drive amount of the correcting lens 610 from the correcting lens target position LC.

Figure 5:
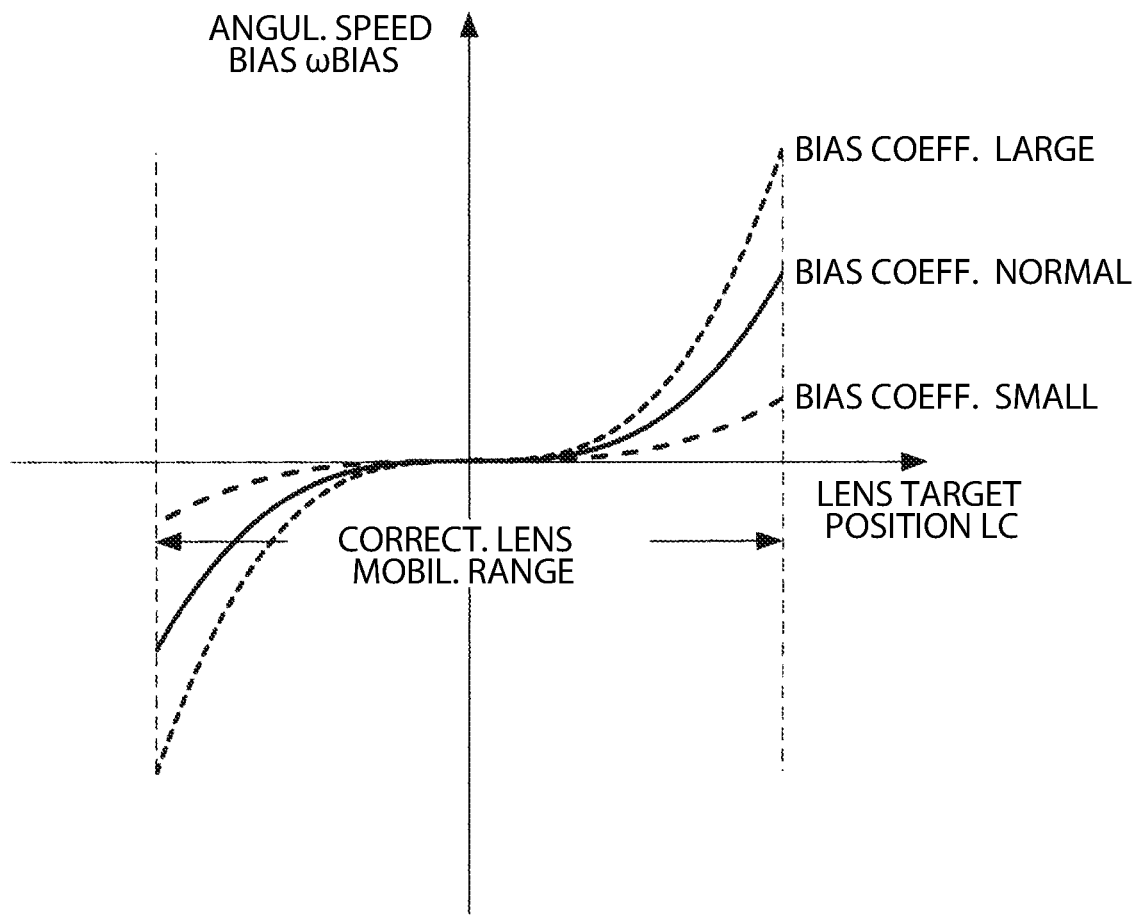
FIG. 5 is a figure for explaining a relationship between an angular speed bias amount ωbias and a correcting lens target position LC.

FIG. 5 is a figure for explaining a relationship between an angular speed bias amount ωbias and a correcting lens target position LC. The vertical axis indicates the angular speed bias ωbias. The horizontal axis indicates the lens target position LC. The correcting lens 610 is driven within a correcting lens mobility range.

Assuming that the center of the mobility range of the correcting lens 610 is 0, the angular speed bias amount ωbias which is an output from the bias calculating unit 524 is calculated using Equation (1). Here, the coefficient Kbias is a predetermined coefficient. In the following explanation, in some cases, Kbias is referred to as a bias coefficient. Also, an output ω' from the subtracting unit 516 is calculated using Equation (2).

$$\omega bias = Kbias \times LC^3 \quad (1)$$

$$\omega' = \omega - \omega bias \quad (2)$$

According to Equation (1), if the correcting lens target position LC is close to the center of the mobility range of the correcting lens 610, it contributes less to the angular speed bias ωbias. On the other hand, as the distance of the correcting lens target position LC from the center of the mobility range increases, it contributes more to the angular speed bias amount ωbias. For this reason, ω' obtained in Equation (2) becomes smaller as the distance of the correcting lens target position LC from the center of the mobility range increases. Therefore, the correcting lens target position LC newly calculated from ω' becomes closer to the center of the mobility range. That is, it acts so as to bring the correcting lens 610 back to the center of the mobility range.

Because if the angular speed bias amount ωbias decreases, shake correction is performed also on large shakes, trackability of the optical axis of the sighting optical system 300 in sighting operation by a user deteriorates, but a shake correction effect increases. On the other hand, because if the angular speed bias amount ωbias increases, shake correction is not performed on large shakes, trackability of the optical axis of the sighting optical system 300 in sighting operation by a user improves, but a shake correction effect decreases.

Also, as can be known from FIG. 5, if the bias coefficient Kbias is changed in Equation (1), the angular speed bias amount ωbias calculated for a constant correcting lens target position LC changes. In this manner, the degree of contribution to the angular speed bias ωbias for the calculated correcting lens target position LC can be adjusted using the bias coefficient Kbias. In the present embodiment, the drive amount calculating unit 500 switches the bias coefficient Kbias as appropriate based on flag information memorized in the memory 512.

Figure 6:
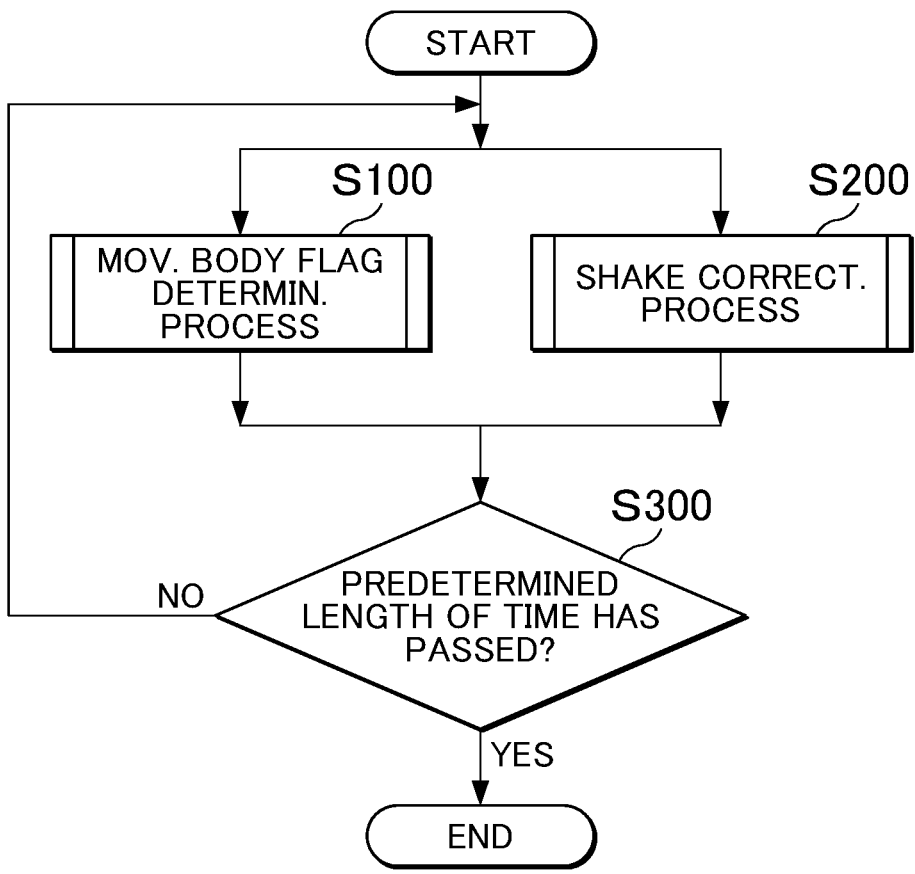
FIG. 6 is a flow diagram for explaining operation of the range finder 10.

FIG. 6 is a flow diagram for explaining operation of the range finder 10. The present flow starts when the power source of the range finder 10 is turned on by a user pressing down the manipulation button 900. The range finder 10 starts a moving body flag determining process (S100) and a shake correction process (S200) that are described below. Specifically, when a user turns on the power source, the control unit 800 outputs a drive signal to the drive amount calculating unit 500. Upon receiving an input of the drive signal, the drive amount calculating unit 500 starts the processes of Step S100 and Step S200.

When the moving body flag determining process (S100) has ended, the procedure shifts to Step S300, and it is judged whether or not a predetermined length of time has passed after a user manipulated the manipulation button 900 last time (S300). The predetermined length of time is a length of time that is necessary and sufficient to complete distance-measurement operation. If it is judged that the predetermined length of time has passed (S300: YES), the drive amount calculating unit 500 ends the present flow. Specifically, the control unit 800 outputs a drive stop signal to the drive amount calculating unit 500. Upon receiving an input of the drive stop signal, the drive amount calculating unit 500 ends the processes of Step S100 and Step S200.

On the other hand, if it is judged that the predetermined length of time has not passed (S300: NO), the drive amount calculating unit 500 continues the process of Step S100 and Step S200. Therefore, if the power source of the range finder 10 is turned on, the present flow is always executed.

Figure 7:
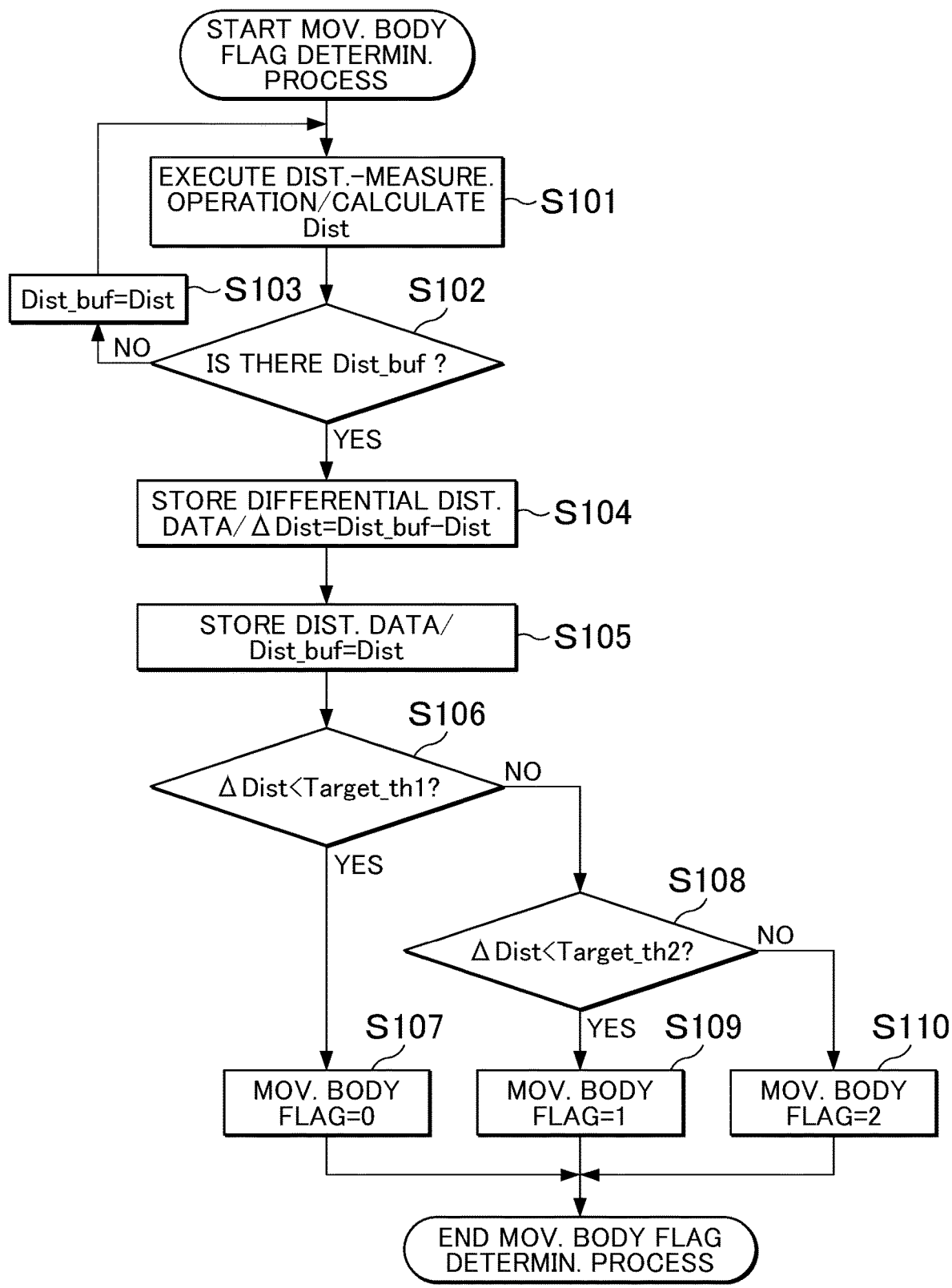
FIG. 7 is a flow diagram for explaining a moving body flag determining process of the range finder 10.

FIG. 7 is a flow diagram for explaining the moving body flag determining process of the range finder 10. As explained with reference to FIG. 6, the present flow starts when the power source of the range finder 10 is turned on by a user pressing down the manipulation button 900.

The distance-measurement signal processing unit 700 executes distance-measurement operation explained with reference to FIG. 1 to calculate a distance Dist to an object (S101). Then, the distance-measurement signal processing unit 700 outputs the Dist to the drive amount calculating unit 500 via the control unit 800. At this time, the drive amount calculating unit 500 judges whether or not a value is stored in Dist_buf (S102). Here, Dist_buf is a variable created in the memory 512 inside the drive amount calculating unit 500. Dist_buf is initialized by data stored at the time of activation of the range finder 10 being deleted.

If it is judged that a value is not stored in Dist_buf (S102: NO), the drive amount calculating unit 500 stores Dist in Dist_buf (S103), and the procedure shifts to Step S101. On the other hand, if it is judged that a value is stored in Dist_buf (S102: YES), the drive amount calculating unit 500 stores absolute value data about a difference between Dist_buf and Dist, that is, data about the amount of temporal change in distances in distance difference data ΔDist (S104). Here, ΔDist is a variable created in the memory 512 in a similar manner to Dist_buf.

The drive amount calculating unit 500 stores Dist in Dist_buf (S105). A value stored in Dist_buf is overwritten with the newly stored Dist.

The drive amount calculating unit 500 judges whether or not ΔDist is lower than a predetermined threshold value Target_th1 (S106). If it is judged that ΔDist is lower than the predetermined threshold value Target_th1 (S106: YES), it is determined that an object is stationary, and a moving body flag memorized in the memory 512 is set to 0 (S107). A default value is defined for the moving body flag, and at the time of activation of the range finder 10, it is set to 0, for example.

On the other hand, if it is judged that ΔDist is not lower than the predetermined threshold value Target_th1 (S106: NO), the drive amount calculating unit 500 judges whether or not ΔDist is lower than a predetermined threshold value Target_th2 (S108).

If it is judged that ΔDist is lower than the predetermined threshold value Target_th2 (S108: YES), the drive amount calculating unit 500 determines that an object is moving in the front-back directions, and sets the moving body flag memorized in the memory 512 to 1 (S109). On the other hand, if it is judged that ΔDist is not lower than the predetermined threshold value Target_th2 (S108: NO), the drive amount calculating unit 500 determines that sighting on an object is lost, and sets the moving body flag memorized in the memory 512 to 2 (S110).

If the moving body flag is determined, and is set to the memory 512, the present flow ends. Then, the procedure shifts to Step S300 in the flow of FIG. 6.

Figure 8:
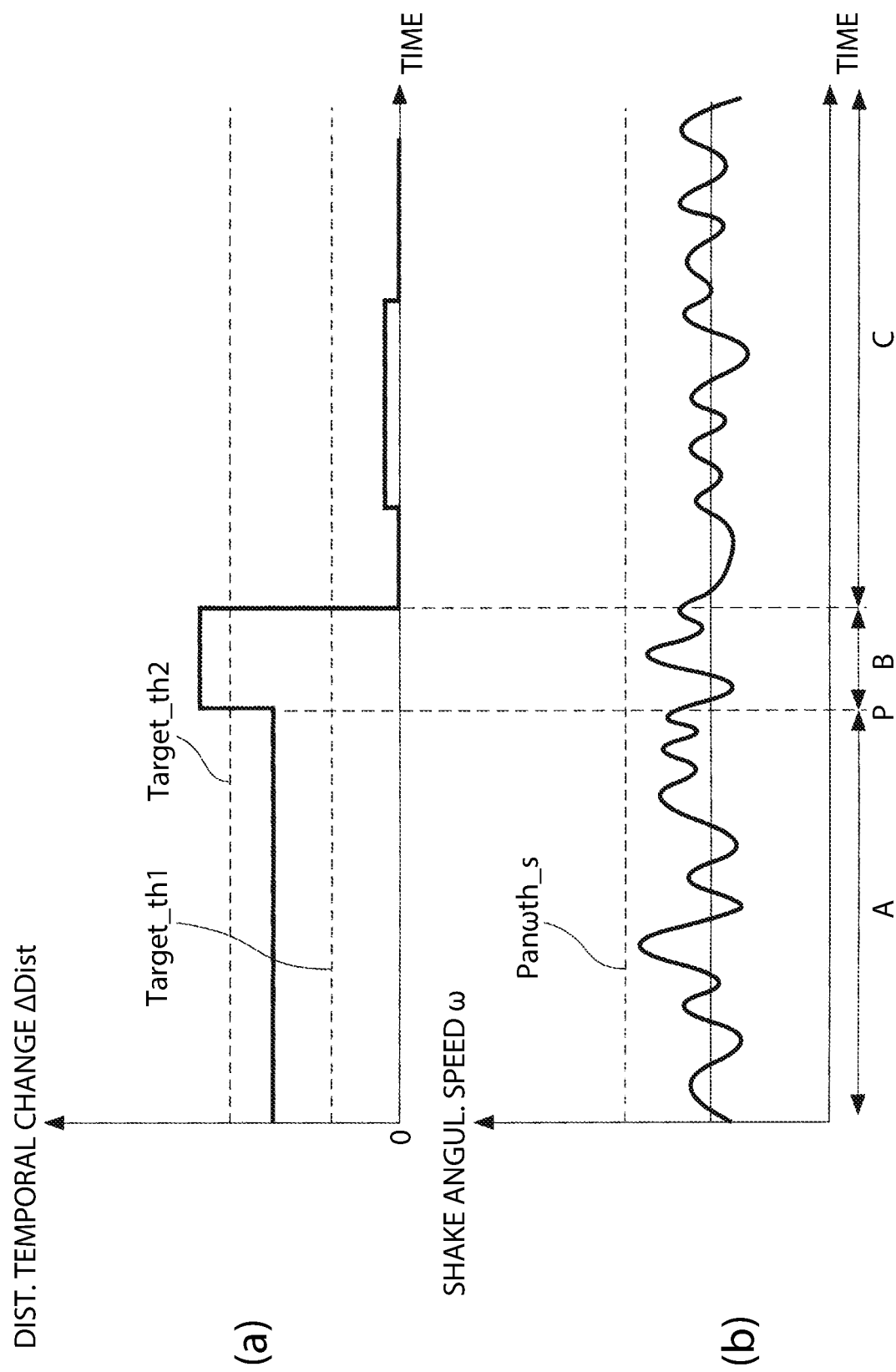
FIG. 8 is a figure showing one example of a distance-measurement sampling result obtained at the time when panning is not detected.
Figure 9:
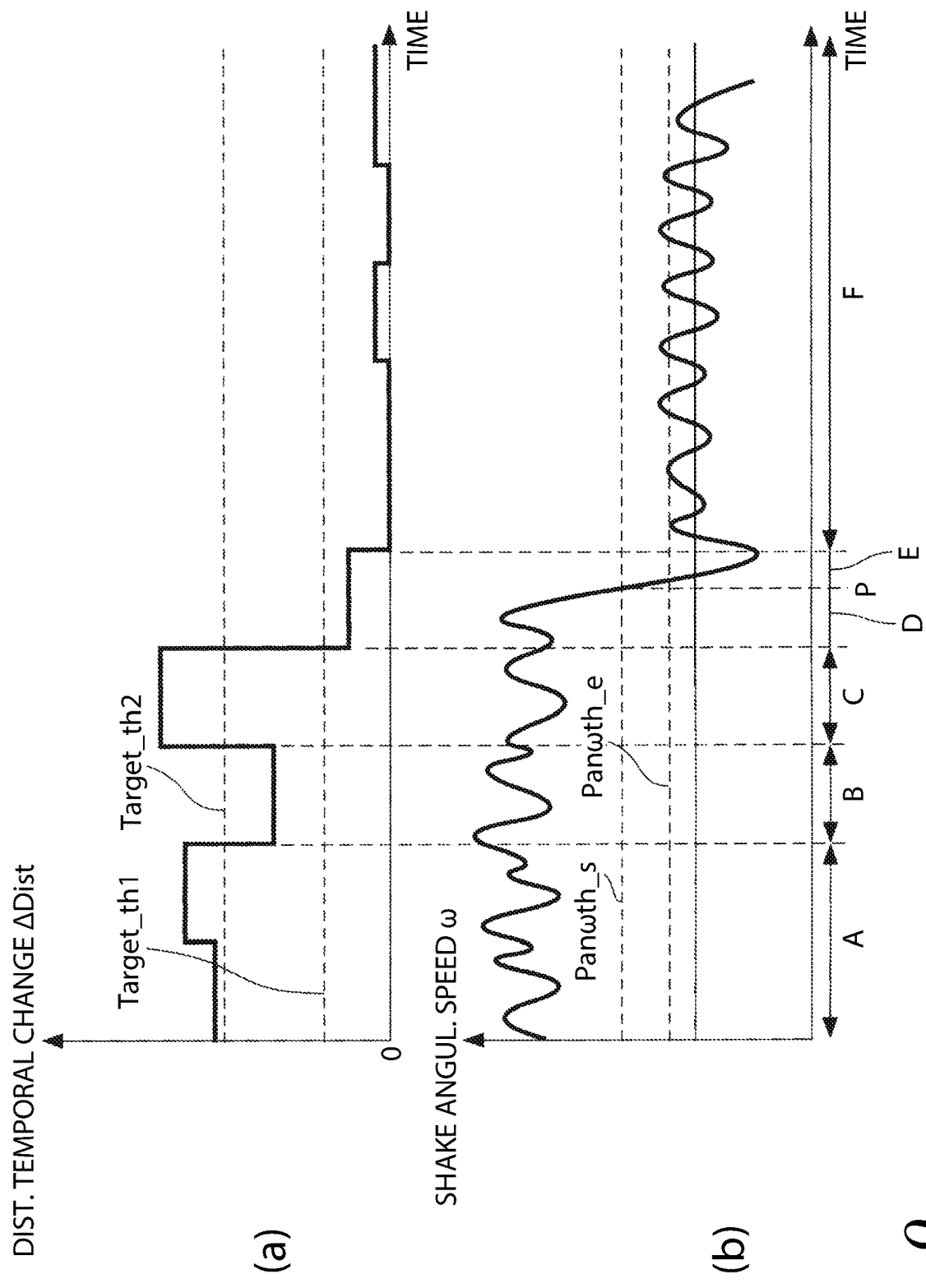
FIG. 9 is a figure showing one example of a distance-measurement sampling result obtained at the time when panning is detected.

Next, with reference to FIGS. 8 and 9, a method of determining a sighting change flag according to temporal changes in distance-measurement results and shake angular speeds ω is explained. Throughout FIGS. 8 and 9, the horizontal axes indicate time, and the vertical axes indicate the amount of temporal changes in distances and an angular speed, respectively. Also, the moving body flag shown in FIG. 7 is explained together.

FIG. 8 shows an example in which a sighting change is not detected during distance-measurement sampling. (a) of FIG. 8 shows temporal transition in the amount of temporal change ΔDist in the distance to an object calculated by the distance-measurement signal processing unit 700. (b) of FIG. 8 shows temporal transition of the shake angular speed ω.

In (a) of FIG. 8, during a period A, ΔDist is between Target_th1 and Target_th2. For this reason, the drive amount calculating unit 500 sets the moving body flag to 1 during the period A. During a period B, ΔDist exceeds Target_th2. For this reason, the drive amount calculating unit 500 sets the moving body flag to 2 during the period B. Also, during a period C, ΔDist becomes lower than Target_th1. For this reason, the drive amount calculating unit 500 sets the moving body flag to 0 during the period C.

In (b) of FIG. 8, there is no period during which the shake angular speed ω exceeds the sighting change start threshold value Panωth_s, so the sighting change flag is unchanged and remains 0.

During the period A, the sighting change flag is set to 0, and the moving body flag is set to 1. It can be known from (a) of FIG. 8 that, during the period, distance-measurement results are changing at a constant proportion after each passage of a certain length of time. In addition, it can be known from (b) of FIG. 8 that a sighting change is not underway during the period. Taking these into account, it can be determined that, during the period, although an object is moving in the front-back directions at a constant speed, a user is being able to sight the range finder 10 on the object. In view of this, the drive amount calculating unit 500 applies default values to all the parameters of the cut-off frequency fc, the bias coefficient Kbias and the correction range if the sighting change flag is set to 0, and the moving body flag is set to 1. However, because an object is moving, and sighting on the object may be lost, the sighting change start threshold value Panωth_s is lowered. Thereby, the drive amount calculating unit 500 can promptly detect a sighting change, change parameters including the cut-off frequency fc and the like to optimum values, and ensure object trackability.

During the period B, the sighting change flag is set to 0, and the moving body flag is set to 2. It can be known from (a) of FIG. 8 that, during the period, distance-measurement results are considerably changing just after a time P. In addition, it can be known from (b) of FIG. 8 that a sighting change is not underway during the period. Taking these into account, it can be determined that a user is being able to capture an object as intended, but not being able to measure the distance to the object, for example. This means, for example, that because the visual angle at the sighting target is small, it is necessary to stabilize sighting in a narrow range by correcting shakes at lower frequency. In view of this, the drive amount calculating unit 500 applies a value lower than 0.1 Hz to the cut-off frequency fc so as to increase a correction effect if the sighting change flag is set to 0, and the moving body flag is set to 2. Also, it applies a value smaller than a default value to the bias coefficient Kbias, and applies a range wider than a default value to the correction range of the correcting lens 610. Also, for example, the sighting change start threshold value Panωth_s is lowered so that quick sighting is possible if a sighting target starts moving. By doing so, if a sighting change is started corresponding to movement of the sighting target, operation of the sighting change can be detected quickly, and parameters including the cut-off frequency fc and the like are changed to optimum values to quickly ensure object trackability.

During the period C, the sighting change flag and the moving body flag are both set to 0. It can be known from (a) of FIG. 8 that a target is stationary during the period. In addition, it can be known from (b) of FIG. 8 that sighting is stable during the period. In view of this, if the sighting change flag and the moving body flag are both set to 0, the drive amount calculating unit 500 applies default values to all the parameters.

FIG. 9 is a figure showing an example in which a sighting change is detected during distance-measurement sampling. In explanation with reference to FIG. 9, (a) and (b) of FIG. 9 both show temporal transition of ΔDist and ω, respectively, in a similar manner to FIG. 8. Explanation that overlaps that for FIG. 8 is omitted.

In (a) of FIG. 9, ΔDist exceeds Target_th2 during the periods A and C. For this reason, the drive amount calculating unit 500 sets the moving body flag to 2 during the periods A and C. Also, during the period B, ΔDist is between Target_th1 and Target_th2. For this reason, the drive amount calculating unit 500 sets the moving body flag to 1 during the period B. Then, during periods D, E and F, ΔDist is lower than Target_th1. For this reason, the drive amount calculating unit 500 sets the moving body flag to 0 during the periods D, E and F.

In (b) of FIG. 9, the shake angular speed ω exceeds the sighting change start threshold value Panωth_s until the time P. For this reason, until the time P, the drive amount calculating unit 500 sets the sighting change flag to 1. At the time P, the shake angular speed ω becomes lower than the sighting change end threshold value Panωth_e. For this reason, the drive amount calculating unit 500 sets the sighting change flag to 0.

During the periods A and C, the sighting change flag is set to 1, and the moving body flag is set to 2. It can be known from (a) of FIG. 9 that, during the period, distance-measurement results are considerably varying after each passage of a certain length of time. In addition, it can be known from (b) of FIG. 9 that a sighting change is not underway during the period. Taking these into account, it can be determined, for example, that, during the period, a user is performing panning in order to perform sighting on an object, and is not being able to capture the object well. In view of this, if the sighting change flag is set to 1 and the moving body flag is set to 2, the drive amount calculating unit 500 applies a value higher than 1.0 Hz to the cut-off frequency fc in order to lower a correction effect and ensure object trackability. Also, it applies a value larger than a default value to the bias coefficient Kbias, and applies a range narrower than a default value to the correction range of the correcting lens 610.

During the period B, the sighting change flag and the moving body flag are both set to 1. It can be known from (a) of FIG. 9 that, during the period, distance-measurement results are changing at a constant proportion after each passage of a certain length of time. In addition, it can be known from (b) of FIG. 9 that a sighting change is underway during the period. Taking these into account, it can be determined, for example, that, during the period, a user is performing panning following movement of an object, and is being able to capture the object well. In view of this, if the sighting change flag is set to 1 and the moving body flag is set to 1, the drive amount calculating unit 500 applies default values to all the parameters.

During the period D, the sighting change flag is set to 1, and the moving body flag is set to 0. It can be known from (a) of FIG. 9 that, during the period, variation in distance-measurement results after each passage of a certain length of time is negligible. In addition, it can be known from (b) of FIG. 9, a sighting change is underway during the period. Taking these into account, it can be determined, for example, that, during the period, a user is performing panning following movement of an object, and is being able to capture the object well. In view of this, if the sighting change flag is set to 1 and the moving body flag is set to 0, the drive amount calculating unit 500 applies default values to all the parameters.

In the above-mentioned manners, in the present embodiment, the drive amount calculating unit 500 dynamically changes parameters according to temporal changes ΔDist in the distance to an object and temporal changes in the shake angular speed ω.

FIG. 10 is a table in which combinations of parameters determined based on sighting change judgment flags and moving body flags in the present embodiment are summarized. The data in the table shown in FIG. 10 is stored in the memory 512 in advance. In calculating a drive amount of the correcting lens 610, the drive amount calculating unit 500 refers to flag information and parameters corresponding to the flag information memorized in the memory 512 to change the parameters successively.

Figure 11:
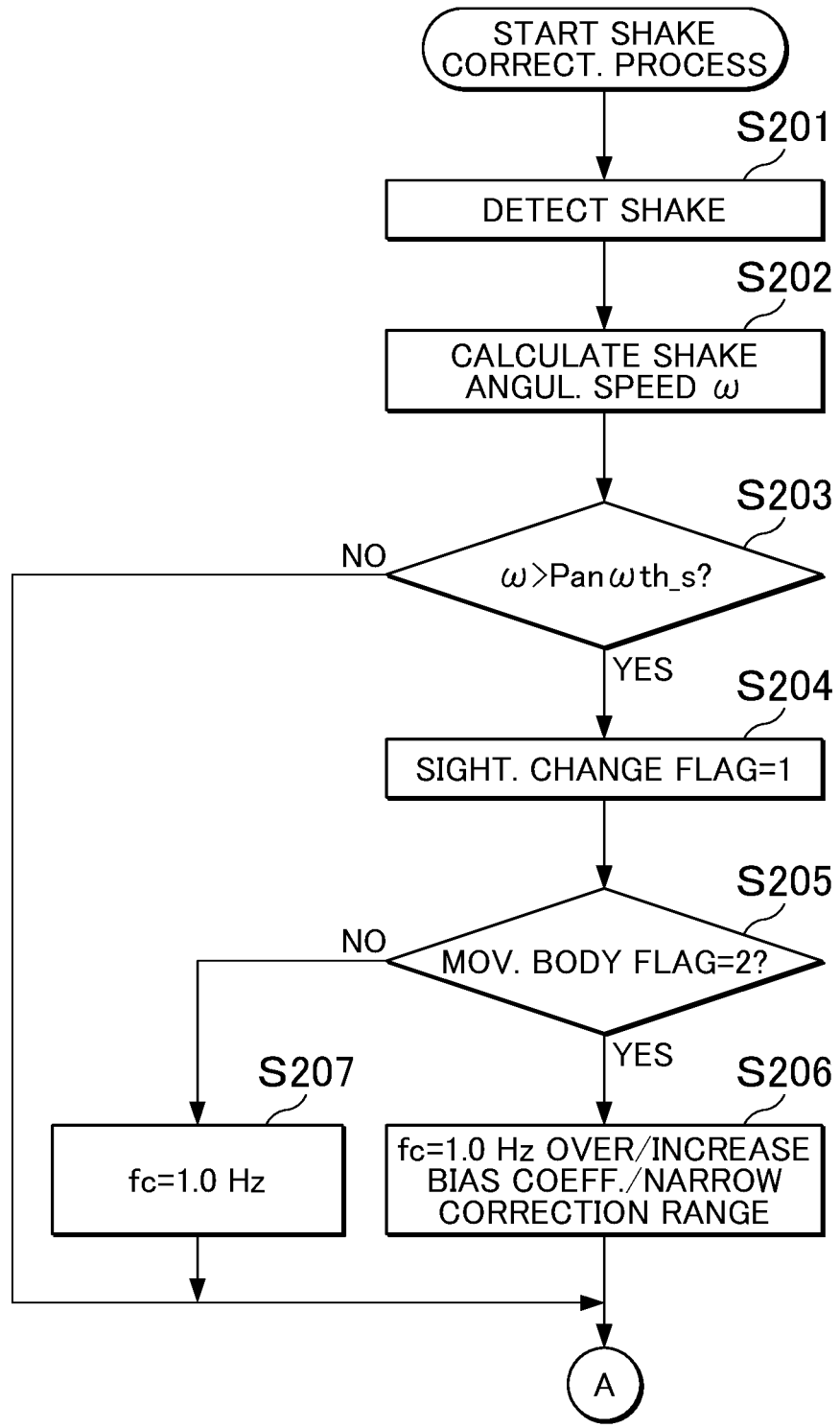
FIG. 11 is a flow diagram for explaining a shake correction process of the range finder 10.
Figure 12:
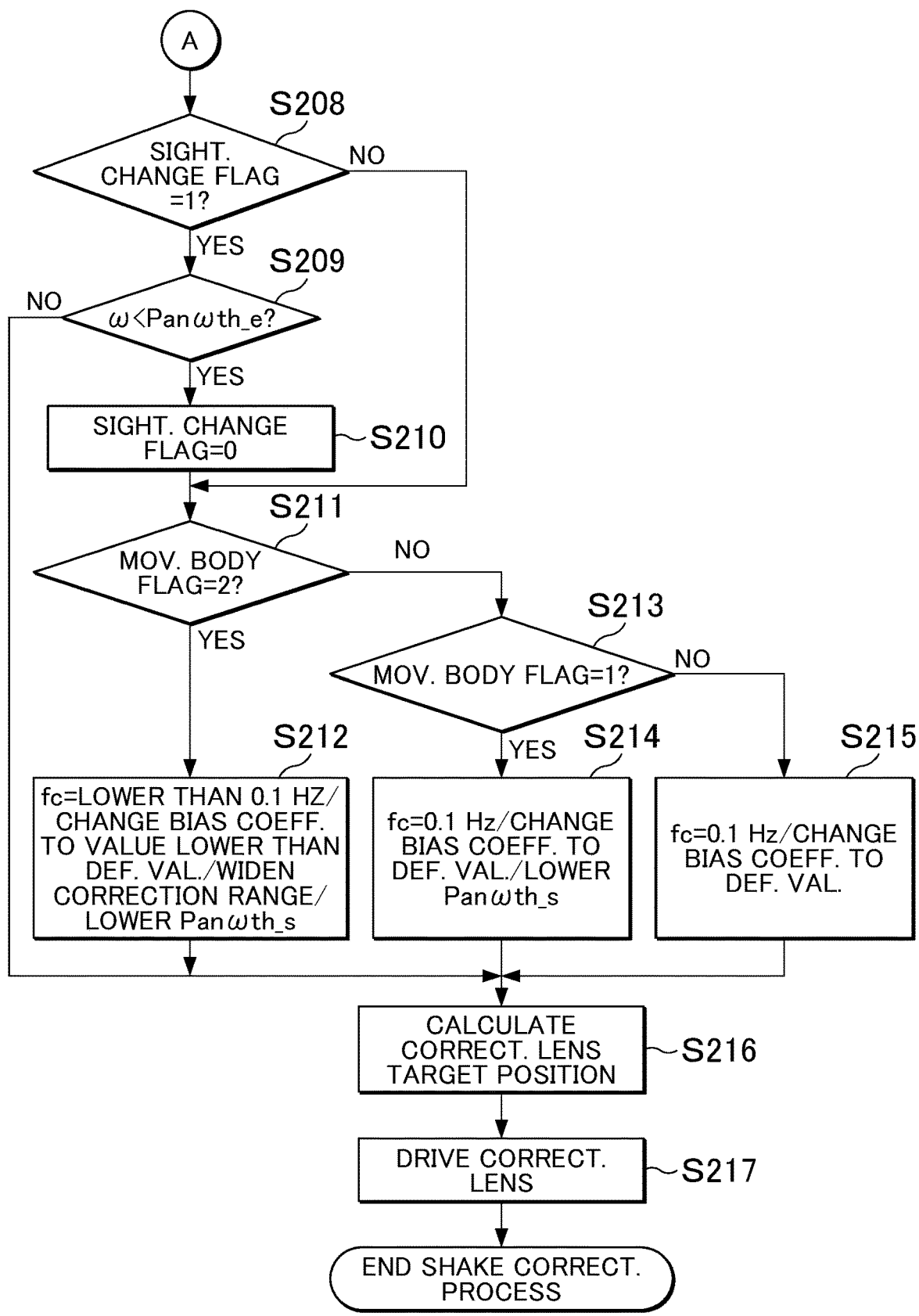
FIG. 12 is a flow diagram for explaining a shake correction process of the range finder 10.

FIGS. 11 and 12 are flow diagrams for explaining the shake correction processes of the range finder 10. As explained with reference to FIG. 6, the present flow starts when the power source of the range finder 10 is turned on by a user pressing down the manipulation button 900.

The shake detecting unit 400 starts shake detection (S201). Then, as explained with reference to FIG. 2, the shake detecting unit 400 outputs a shake detection signal to the drive amount calculating unit 500. As also explained with reference to FIG. 2, the drive amount calculating unit 500 performs the quantization process and the HPF process on the shake detection signal to calculate a shake angular speed ω (S202).

The drive amount calculating unit 500 judges whether or not the shake angular speed ω exceeds a predetermined threshold value Panωth_s (S203). If it is judged that the shake angular speed ω does not exceed the predetermined threshold value Panωth_s (S203: NO), setting of a sighting change flag memorized in the memory 512 is not performed, but the procedure shifts to Step S208.

On the other hand, if it is judged that the shake angular speed ω exceeds the predetermined threshold value Panωth_s (S203: YES), that is, if it is judged that a sighting change is started, the drive amount calculating unit 500 sets a sighting change flag memorized in the memory 512 to 1 (S204). The drive amount calculating unit 500 judges whether or not a moving body flag memorized in the memory 512 is set to 2 (S205).

If it is judged that the moving body flag is set to 2 (S205: YES), the drive amount calculating unit 500 applies a value larger than 1.0 Hz to the cut-off frequency fc to be used at the LPF processing unit 514. Also, it applies a value larger than normal to the bias coefficient Kbias. Furthermore, it applies a range narrower than normal as a correction range (S206). On the other hand, if it judged that the moving body flag is not set to 2 (S205: NO), the drive amount calculating unit 500 applies 1.0 Hz to the cut-off frequency fc to be used at the LPF processing unit 514 (S207).

Next, the procedure shifts to Step S208 in FIG. 12. The drive amount calculating unit 500 judges whether or not the sighting change flag memorized in the memory 512 is set to 1 (S208). That is, it judges whether or not a sighting change was underway in an immediately preceding process. If it is judged that the sighting change flag is not set to 1 (S208: NO), the procedure shifts to Step S211.

On the other hand, if it is judged that the sighting change flag is set to 1 (S208: YES), it is judged whether or not the shake angular speed ω is lower than a predetermined threshold value Panωth_e (S209). Here, Panωth_e is a threshold value of angular speed for judging that a sighting change performed by a user has ended.

If it is judged that the shake angular speed ω is not lower than Panωth_e (S209: NO), the procedure shifts to Step S216. On the other hand, if it is judged that the shake angular speed ω is lower than Panωth_e (S209: YES), the drive amount calculating unit 500 sets a sighting change flag memorized in the memory 512 to 0 (S210).

The drive amount calculating unit 500 judges whether or not the moving body flag is set to 2 (S211).

If it is judged that the moving body flag is set to 2 (S211: YES), the drive amount calculating unit 500 applies a value smaller than 0.1 Hz to the cut-off frequency fc to be used at the LPF processing unit 514. Also, it applies a value smaller than a default value to the bias coefficient Kbias. Then, it applies a range wider than normal as a correction range. Furthermore, it applies a value smaller than normal to Panωth_s (S212).

If it is judged that the moving body flag is not set to 2 (S211: NO), the drive amount calculating unit 500 judges whether or not the moving body flag is set to 1 (S213). If it is judged that the moving body flag is not set to 1 (S213: YES), the drive amount calculating unit 500 applies 0.1 Hz to a cut-off frequency fc to be used at the LPF processing unit 514. Also, it applies a default value to the bias coefficient Kbias. Then, it applies a value smaller than normal to Panωth_s (S214). On the other hand, if it is judged that the moving body flag is not set to 1 (S213: NO), the drive amount calculating unit 500 applies 0.1 Hz to a cut-off frequency fc to be used at the LPF processing unit 514. Also, it applies a default value to the bias coefficient Kbias (S215).

The drive amount calculating unit 500 uses the parameters determined in the above-mentioned processes to calculate a correcting lens target position LC (S216). Then, the drive amount calculating unit 500 performs shake correction by driving the correcting lens 610 via the drive unit 620 (S217).

If the shake correction process completes, the present flow ends. Then, the procedure shifts to Step S300 of the flow in FIG. 6.

In FIG. 1 mentioned above, the objective lens 110, the light-receiving lens 210 and the ocular lens 310 are each presented as a single lens representatively. However, these lenses may each include a plurality of lenses.

Furthermore, the objective lens 110, the light-receiving lens 210 and the ocular lens 310 may each have a variable focal length.

The light-emitting unit 130 may emit ultraviolet light instead of infrared light. In this case, one corresponding to ultraviolet light is used also for the dichroic reflection surface 122 of the erecting prism 120 in the first embodiment.

In the explanation above, a state of an object (stationary, moving in the front-back directions, and the like) is judged according to a relationship with the threshold values Target_th1 and Target_th2 using temporal changes ΔDist in distance-measurement results, but fluctuation, for example RMS (root-mean-square), of distances to an object that are measured in multiple times of measurement, and RMS of temporal changes in the measurement distances may be calculated, and the state may be judged based on threshold values predetermined for those values.

Also, distance-measurement for judging a state of an object may be performed using a smaller number of pulses than a number of pulses used in normal distance-measurement operation. Furthermore, this is not the sole example, and a distance-measurement method not using a histogram may be applied.

Adjustment of all the control parameters in shake correcting operation including a cut-off frequency fc, a bias coefficient Kbias, a correction range and the like may be performed, or adjustment of any one or a combination of two of the control parameters may be performed.

Although in the explanation above, a bias coefficient Kbias is used as a control parameter for shake correcting operation, control may be performed such that an angular speed bias ωbias itself is changed.

Although in the explanation above, control parameters are adjusted according to temporal changes in measurement distances, control parameters may be adjusted according to measured distances to sighting targets. Here, considering, as one example, a case where a sighting target object is a moving object moving at a speed, the longer the distance to the sighting target, the lower the angular speed added to a range finder for performing sighting. On the other hand, the shorter the distance to the sighting target, the higher the angular speed added to the range finder for performing sighting. In view of this, for example, a sighting change start threshold value is changed according to a distance to the sighting target.

Specifically, for example, a distance threshold value Dth for classifying a distance range into two near and far ranges is defined in advance. Then, it is judged whether or not a distance-measurement result is larger than the distance threshold value Dth. If it is judged that the distance-measurement result is larger than the distance threshold value Dth, it is determined that the sighting target is in the far range, and the sighting change start threshold value is raised. On the other hand, if it is judged that the distance-measurement result is smaller than the distance threshold value Dth, it is determined that the sighting target is in the near range, and the sighting change start threshold value is lowered. By performing control in this manner, it is possible to correct a relatively small shake and perform stable sighting if the distance to a sighting target which is a moving object is long. On the other hand, it is possible to ensure sighting target trackability if the distance to a sighting target which is a moving object is short.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A distance detection device comprising:
a calculating unit that calculates a distance to a detection target using a length of time until floodlighted light is received by a light-receiving unit;
a first detecting unit that detects a shake;
a second detecting unit that detects variation in the distance calculated by the calculating unit;
a shake correcting optical system that is driven based on a shake detection result and through which the floodlighted light passes; and
a control unit that controls driving of the shake correcting optical system using an output from the first detecting unit and an output from the second detecting unit, wherein
the control unit performs control such that the first detecting unit detects a detection target changing operation if the first detecting unit has not detected a shake amount that exceeds a predetermined shake threshold value and the second detecting unit has detected a larger variation in the distance than a first threshold value.

2. The distance detection device according to claim 1, wherein the control such that the first detecting unit detects the detection target changing operation includes changing a predetermined sighting start threshold value that represents a start of sighting change.

3. The distance detection device according to claim 1, wherein the control unit does not perform the control such that the first detecting unit detects the detection target changing operation if the first detecting unit has detected the shake amount that exceeds the predetermined shake threshold value.

4. An optical instrument comprising the distance detection device according to claim 3.

5. An optical instrument comprising the distance detection device according to claim 2.

6. An optical instrument comprising the distance detection device according to claim 1.

7. A distance detection device comprising:
a calculating unit that calculates a distance to a detection target using a length of time until floodlighted light is received by a light-receiving unit;
a first detecting unit that detects a shake;
a second detecting unit that detects variation in the distance calculated by the calculating unit;
a shake correcting optical system that is driven based on a shake detection result and through which the floodlighted light passes; and
a control unit that controls driving of the shake correcting optical system using an output from the first detecting unit and an output from the second detecting unit wherein the control unit performs at least one of (i) control to make wider a range of frequency of the shake detected by the first detecting unit, (ii) a lower degree of control to bring the shake correcting optical system close to a predetermined position, and (iii) control to make wider a range within which the shake correcting optical system is driven, compared to if the first detecting unit has detected a shake amount that exceeds a predetermined shake threshold value and the second detecting unit has detected a larger variation in the distance than a second distance threshold value, if the first detecting unit has not detected the shake amount that exceeds the predetermined shake threshold value and the second detecting unit has detected larger variation in the distance than the second distance threshold value.

8. An optical instrument comprising the distance detection device according to claim 7.

* * * * *